United States Patent [19]

Boiraeu et al.

[11] Patent Number: 4,921,371
[45] Date of Patent: May 1, 1990

[54] VIBRATION RESISTANT SECURING MEANS, ESPECIALLY FOR SECURING A BRUSH CARRIER PLATE TO A BEARING CARRIER PLATE OF AN ELECTRIC MOTOR

[75] Inventors: Christian Boiraeu, Guyancourt; Patrick Larseneur, Courbevoie, both of France

[73] Assignee: Valeo, Paris, France

[21] Appl. No.: 315,146

[22] Filed: Feb. 24, 1989

[30] Foreign Application Priority Data

Feb. 26, 1988 [FR] France ................ 88 02346

[51] Int. Cl.⁵ ............................................. B25G 3/00
[52] U.S. Cl. ................................ 403/408.1; 403/71; 411/41
[58] Field of Search ............... 403/408.1, 71, 188; 411/41, 45, 907

[56] References Cited

U.S. PATENT DOCUMENTS

| | | | |
|---|---|---|---|
| 3,319,918 | 5/1967 | Rapata | 248/238 |
| 4,050,771 | 9/1977 | Watson | 411/907 X |
| 4,176,428 | 12/1979 | Kimura | 24/362 |
| 4,352,589 | 10/1982 | Allison | 403/408.1 |

FOREIGN PATENT DOCUMENTS

| | | |
|---|---|---|
| 3346503 | 7/1985 | Fed. Rep. of Germany . |
| 1531027 | 6/1968 | France . |
| 2393456 | 12/1978 | France . |
| 380446 | 9/1964 | Switzerland .................. 411/45 |
| 989967 | 4/1965 | United Kingdom . |

Primary Examiner—Andrew V. Kundrat
Attorney, Agent, or Firm—Dennison, Meserole, Pollack & Scheiner

[57] ABSTRACT

A vibration resistant fixing or securing means, for fastening or securing a first member to a second member, comprises a resilient bush gripping one of the said members and having a fastening stud, carried by the other of the said members, extending through it. The fastening stud and the said first member are so shaped as together to constitute a compression stud assembly comprising a male part and a female part, which are adapted to be locked together and to extend through an opening formed in the second member and resilient bush, the latter comprising a boss having one free end portion with a radially projecting portion at its other end, and the compression stud assembly including a shoulder and a flared portion, which cooperate to maintain the free end portion and radially projecting portion of the bush respectively in gripping contact with edges of the opening in the second member.

9 Claims, 2 Drawing Sheets

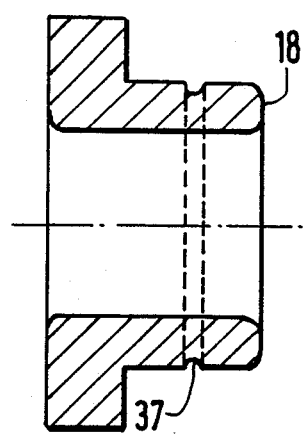
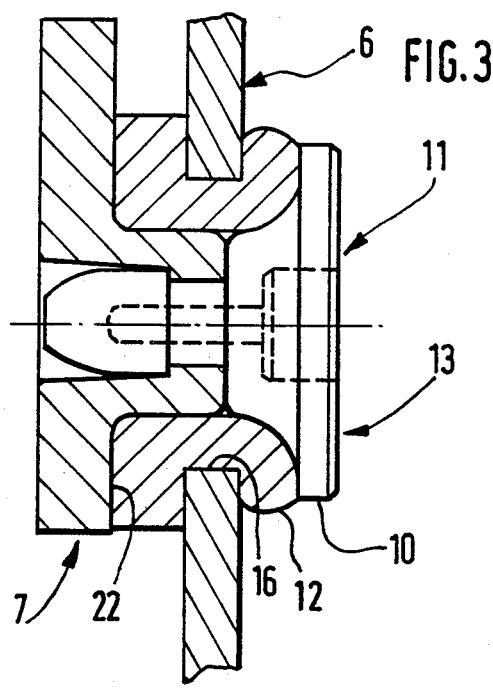
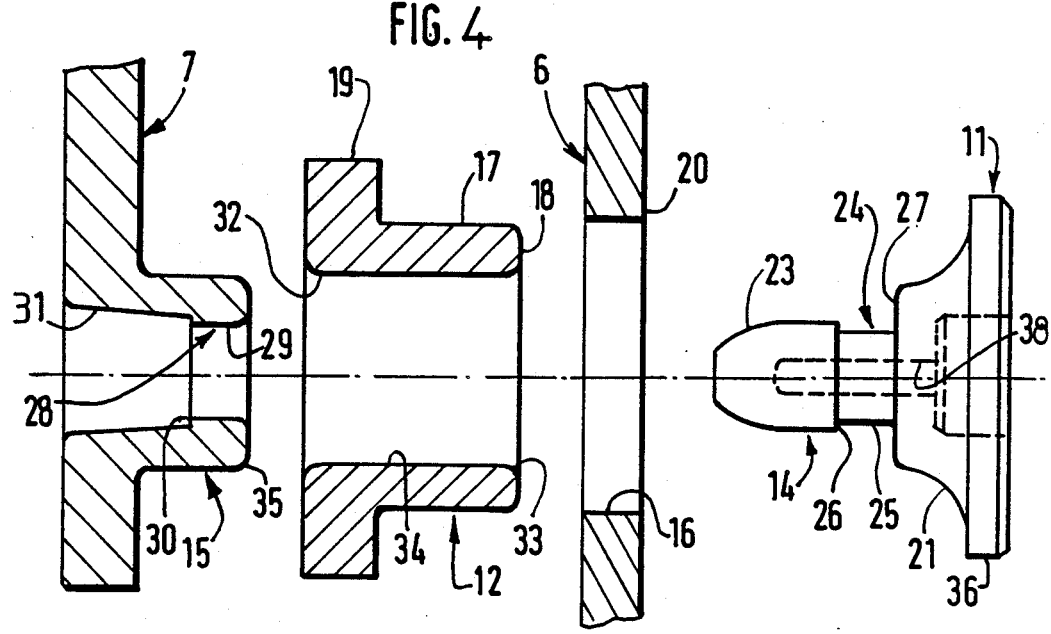

VIBRATION RESISTANT SECURING MEANS, ESPECIALLY FOR SECURING A BRUSH CARRIER PLATE TO A BEARING CARRIER PLATE OF AN ELECTRIC MOTOR

FIELD OF THE INVENTION

This invention relates to vibration resistant securing means for securing a first member to a second member. The field of the invention includes, without limitation, means for securing a brush carrier plate to a bearing carrier plate of an electric motor. The type of securing means to which the invention relates is that which includes a resilient element which is arranged to grip one of the said members and which has a fastening member, carried by the other of said members, extending through it.

The field of the invention also embraces a method of assembling such a securing means, and to fastening members suitable for use therein.

BACKGROUND OF THE INVENTION

An arrangement of the general kind mentioned above is described in the French patent publication No. FR-23 93456A, n which it is proposed to use a resilient element having a groove adapted to receive and to grip an edge of one of the two members being fastened together.

Apart from the difficulties of manufacture involved in removing the resilient element from its mould while preserving the precise dimensions of the groove, that arrangement is not well adapted to the automatic assembly of the resilient element on the member concerned.

In addition, the member that carries the fastening member of the securing means has a complex shape in response of the seatings with which it is provided for the resilient elements, especially since it has to be arranged to house gripping members. Assembly of this arrangement is somewhat complicated.

Besides all this, the fastening member is conical in shape and exerts a gripping force on the resilient element itself. This gripping force can be too great, so that it can contribute unduly to the generation of noise.

SUMMARY OF THE INVENTION

An object of the present invention is to mitigate these disadvantages.

Another object of the invention is to provide a vibration resistant securing means of simplified form.

A further object of the invention is to provide a vibration resistant securing means having a resilient element which is easy to remove from its mould.

Yet another object of the invention is to provide such a fixing means which is well adapted to automatic assembly.

It is also an object of the invention to produce other advantages.

According to the invention, therefore, the invention provides a vibration resistant securing means of the kind generally defined above, in which the fastening member and the said first member are so shaped as together to constitute a compression stud assembly comprising a male part and a female part which are adapted to be locked together and to extend through an opening formed in the said second member and resilient element, the latter comprising a boss having one free end portion and a radially projecting portion at its other end, and the compression stud assembly having a shoulder and a convergent portion extending from the shoulder and cooperating with it to maintain the said free end portion and radially projecting portion of the resilient element respectively in gripping contact with edges of the said opening in the said second member.

The method of assembling the securing means according to the invention is characterised by the steps of: engaging the said boss axially in the opening in the said second member; then mounting the female part of the compression stud assembly in the said boss; and finally causing the convergent portion of the compression stud assembly to deform the free end portion of the boss into contact with the said edge of the opening until the male and female parts become locked together.

The securing means according to the invention is simplified, mainly because the fastening member is such that it has itself a gripping action, with the resilient element being of a simpler form than hitherto. A firm and reliable locking action is obtained, to which end the convergent portion of the fastening member, and its associated shoulder, can be made to any desired radius.

In addition, the arrangement renders it unnecessary to manufacture the resilient element to very exact tolerances. It also facilitates automatic assembly by simple axial engagement of the different members one within the other, without any risk to the integrity of the joint. Furthermore, in determining the dimensions of the compression stud assembly, it can easily be arranged that there is no excessive gripping of the resilient element, and this therefore enables the securing means to absorb noise more effectively.

The boss portion of the resilient element is preferably made with a thickness less than that of the radial projection of the same element.

In this way, the free end portion of the boss is able to be expanded to a considerable extent, and the compression stud assembly can be put together more easily. The said first member, of the members being secured together, may itself carry the male part of the compression stud assembly and the fastening member or element of the female part. Preferably, however, the reverse arrangement is used.

In its application to an electric motor generally, the brush carrier plate is made of synthetic plastic material, in such a way that it is easy to form the female part simply by moulding it integrally with the brush carrier plate.

The female part is shorter than the boss portion so as to favour expansion by deformation of the free end portion of the resilient element, and may be provided with a female locking portion having a frusto-conical engagement surface terminating in a locking shoulder. The male part then has a male locking portion which includes a profiled penetrating portion. The latter may for example be in the form of a half olive or a bullet, terminating opposite its free end in a groove for receiving around it the engagement surface of the female part, the groove being slightly longer than the engagement surface.

As a result of this arrangement, and with the fastening member being generally of rivet-like form and preferably also made of synthetic plastics material, there is no risk of the penetrating head of the latter damaging the resilient element, while the female locking part is able to expand radially until mutual locking between the male part and the female part has been achieved.

In a modification, if necessary, and particularly if one of the parts of the compression stud assembly is of metal, it is possible to make the penetrating portion of the fastening member, and/or the engagement surface of the female part, more yielding by splitting one or the other.

The features and advantages of the invention will appear more clearly from the description which follows, which is given by way of example and with reference to the accompanying diagrammatic drawings.

BRIEF DESCRIPTION OF THE DRAWINGS

FIG. 3 is a partial view in axial cross-section of the securing means according to the invention.

FIG. 4 shows the various components of the securing means before being assembled together.

FIG. 5 shows an alternative form of the resilient element of the securing means.

DESCRIPTION OF PREFERRED EMBODIMENTS

Figure 1:
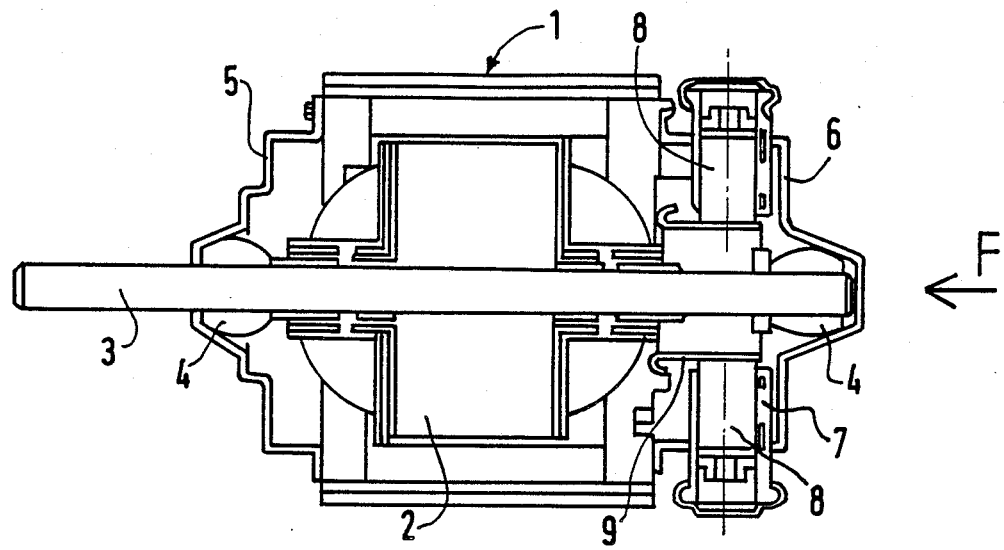
FIG. 1 is a view in axial cross-section of an electric motor incorporating features of the invention.
Figure 2:
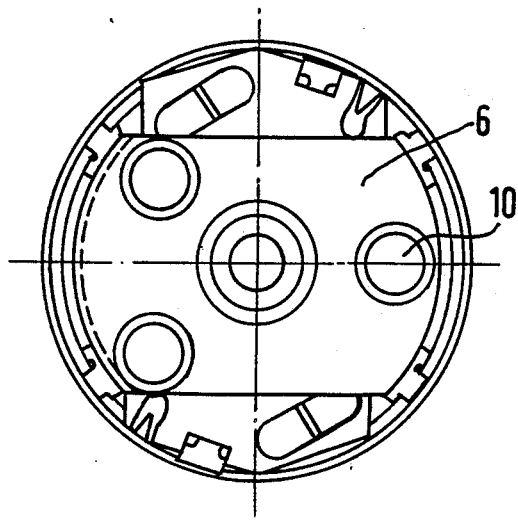
FIG. 2 is a view in the direction of the arrow F in FIG. 1.

Referring to FIG. 1, this shows a simplified cross-section of an electric induction motor, which in this example is a motor for use in a heating installation for an automotive vehicle, and which has an inductor or stator 1. A rotor 2 is mounted within the stator 1 and is mounted on a shaft 3 which is carried in self aligning bearings 4, each of which is mounted in a respective one of two bearing carrier plates 5 and 6. The carrier plates 5 and 6 are secured to the stator 1, and the carrier plate 6 is assembled with a brush carrier plate 7 in a manner to be described below. It carries carbon brushes 8 in contact with a communtator 9 which is shown diagrammatically. In FIG. 2, the head 10 of a fastening member 11 in accordance with the present invention can be seen.

In greater detail, the bearing carrier plate 6 is secured to the brush carrier plate 7, which in this example is made of plastics material, by at least one anti-vibration securing means in accordance with the invention and including a resilient element in the form of a bush 12. The brush carrier plate 7 and the bearing carrier plate 6 constitute a first member and a second member respectively. It is a feature of the securing means that the fastening member 11, in the form of a stud, and the first member 7 are so shaped that they together provide a compression stud assembly 13, having a male part 14 and a female part 15 which can be locked together and which are arranged so as to extend through an opening 16 formed in the second member 6 and the resilient bush 12. The resilient bush 12 has a boss 17 which carries a radial flange 19 at one end.

The free end portion 18 of the boss and the radial flange 19 are together held in gripping contact with the edges 20 of the opening 16 by a convergent, flared portion 21 and a shoulder 22, of the compression stud assembly 13.

In order to ensure the required expansion of the free end portion 18 of the resilient bush 12, the female part 15 is preferably made shorter than the boss 17.

Although in this example the first and second members mentioned above are the brush carrier plate 7 and the bearing carrier plate 6, it will be understood that in other embodiments the opposite may be true.

The resilient bush 12 may for example be made of rubber. After the bush 12 and the stud 11 have been mounted, the bush 12 embraces the carrier plate 6, since the stud 11 (which in this example is of plastics material) includes the male part 14 of the stud assembly 13 and is generally in the form of a rivet. The free end of the male part 14 is formed with a profiled penetrating portion 23 which is generally in the shape of the half of an olive at one end. Its other end has a shoulder 26 which faces towards a shoulder 27 defining the end of the head 10 of the stud 11. Extending between the shoulders 26 and 27 is a cylindrical portion 25, so that an annular groove 24 is defined around the latter.

The female part extends axially from the brush carrier plate 7 and is of tubular form. Its projecting end has a female locking portion 28 with a frusto-conical internal surface 29, terminating at its inner end in a locking shoulder 30. The transverse main portion of the brush carrier plate 7 acts as a shoulder 22. It will be understood that the profiled portion 23 and the groove 24 constitute the male locking elements, with the axial length of the groove 24 being slightly greater than the length of the frusto-conical surface 29, while the profiled portion 23 is of slightly larger diameter than the portion 29. As can be seen more easily from FIG. 4, the portion 29 is extended by a frusto-conical portion 31 of larger diameter and convergent in the opposite direction from the portion 29. The portion 31 terminates at the shoulder 30. After assembly, the profiled portion 23 of the male part lies within this frusto-conical female portion 31. The length of the profiled portion 23 is chosen accordingly.

It will be realised that these arrangements facilitate dismantling, and that the axial extremities of the portions 31 and 29 are radiussed. The same is true for the axial extremities 32 and 33 of the bore 34 of the boss 17 of the resilient bush 12; and also for the free end 35 of the female part 15. The thickness of the boss 17 is smaller than that of the radial flange 19 (which in this example is a simple annular collar), and has an external diameter approximately the same as the internal diameter of the opening 16. The opening 16 is a simple circular hole in this example. In order to facilitate insertion of the boss 17 into the hole 16, the outer diameter of the boss 17 is preferably slightly smaller than the inner diameter of the hole 16. By contrast, however, the outer diameter of the bore 34.

The stud 11 has a central hole 38, so as to reduce its mass and at the same time to engage with a suitable centring member for use in automatic assembly.

The head 10 of the stud 11 comprises a cylindrical portion 36, the back of which forms a shoulder around the function between the cylindrical portion 36 and the flared portion 21, the greatest diameter of which, at this shoulder, is smaller than that of the portion 36 so as to constitute a relieved portion of the head 10.

Assembly is carried out in the following manner. The boss 17 is inserted into the hole 16, this being facilitated by the radiussed end portion 18 of the boss 17. The female part 15 is then inserted into the bore 34 of the resilient bush 12, this again being facilitated by the radiussed portions at 35 and 32. The profiled portion 23 is then forced, with radial deformation of the female part, into the engagement portion 29. This is also accompanied by radial expansion of the end portion 18 of the resilient bush 12 by contact with the flared portion 21. Axial movement is continued until the shoulder 26 has reached a point just beyond the shoulder 30 as shown in FIG. 3. On completion of the operation, the male part 14 and female part 15 are locked tightly together by cooperation of the shoulder 26 and 30, with the collar 19 and the end portion 18 of the resilient bush 12 gripping against the sides 20 of the bearing carrier plate 6. In this connection, it will be noted from FIG. 3 that the end portion 18 has been turned over so as to define a face which is generally parallel to the collar 19.

It follows from the foregoing that the axial length of the female part 15 is smaller than that of the boss 17, and the diameter off the cylindrical portion 36 is greater than that of the hole 16, while the gripping action of the flange portion 19 and the expanded end portion 18 depends mainly on the axial distance separating the cylindrical portion 36 of the head 10 and the shoulder 22 formed on the carrier plate 7.

Referring now to FIG. 5, in the modification shown, a circumferential groove 37 is provided externally on the boss 17 to facilitate the radial expansion of the end portion 18. As can be seen from FIG. 2, the brush carrier plate 7 is secured to the bearing carrier plate 6 by means of three of the securing means described above, disposed in a triangular configuration.

In all cases, a sound deadening mounting can be obtained, since the invention enables the resilient element, such as the bush 12, to be so arranged as not to be over-compressed.

The present invention is of course not limited to the embodiments described, but embraces all possible embodiments. For example, the groove 24 and profiled penetrating portion of the male part may have their positions reversed and constitute the tubular axial projecting portion of the brush carrier plate 7. In this case, the portion 29 and shoulder 30 form part of the fastening member corresponding to the stud 11.

Similarly, the convergent portion 21 may be carried by the plate 7, with the fastening member 11 then having a shoulder corresponding to the shoulder 22. In this case, the end portion 18 of the resilient element 12 is gripped between the carrier plate 7 and the carrier plate 6.

While, in the embodiments described above, the male part 14 and female part 15 are made integral with the members 6 and 7 of which they form a part, it is possible to attach the male and female part to the said members as separate components; and at least one of those parts may be split so as to facilitate assembly.

Finally it is possible to reverse the functions of the carrier plates 7 and 6, with the resilient element 12 then embracing the carrier plate 7.

What is claimed is:

1. A vibration resistant fixing means for fastening a first member, for example a brush carrier plate of an electric motor, to a second member, for example a bearing carrier plate of a said motor, said fixing means comprising a fastening member and a resilient element, said fastening member extending through said resilient element, with the resilient element gripping one of said first and second members and the fastening member being carried by the other, characterised in that the fastening member and the said first member are so shaped as together to constitute a compression stud assembly comprising a male part and a female part which are adapted to be locked together and to extend through an opening formed in the said second member and resilient element, the latter comprising a boss having one free end portion and a radially projecting portion at its other end, and the compression stud assembly having a shoulder and a convergent portion extending from the shoulder and cooperating with it to maintain the said free end portion and radially projecting portion of the resilient element respectively in gripping contact with edges of the said opening in the said second member.

2. Fixing means according to claim 1, characterised in that the thickness of the said boss is less than that of the radially projecting portion of the resilient element.

3. A fixing means according to claim 1 or claim 2, characterised in that the female part is shorter in axial length than the said boss.

4. A fixing means according to claim 1, characterised in that the fastening member has a profiled penetrating portion and means defining a groove for receiving a surrounding element of the female part, and the penetrating portion extending axially from the said groove.

5. A fixing means according to claim 1 or claim 4, characterised in that the fastening member has a head comprising a cylindrical portion defining the said shoulder of the compression stud assembly, the said convergent portion being a relieved portion of the head, extending from the said shoulder.

6. A fixing means according to claim 1, characterised in that the said first member includes a tubular portion having an internal frusto-conical portion defining a terminal shoulder, for engaging with a portion of the male part.

7. A fixing means according to claim 6, characterised in that the fastening member has a profiled penetrating portion and means defining a groove for receiving a surrounding element of the female part, and the penetrating portion extending axially from the said groove, the length of the said groove being greater than that of the said frusto-conical portion.

8. A method of assembling a fixing means according to claim 1, characterised by the steps of: engaging the said boss axially in the opening in the said second member; athen* mounting the female part of the compression stud assembly in the said boss; and finally causing the convergent portion of the compression stud assembly to deform the free end portion of the boss into contact with the said edge of the opening until the male and female parts become locked together.

9. A method according to claim 8, further characterized by the step of engaging the male part in the female part beyond the position of mutual locking of the said parts, and then releasing the applied engaging force.

* * * * *